United States Patent [19]

Pidgeon, Jr. et al.

[11] Patent Number: 4,912,721

[45] Date of Patent: Mar. 27, 1990

[54] CABLE TELEVISION SPREAD SPECTRUM DATA TRANSMISSION APPARATUS

[75] Inventors: Rezin E. Pidgeon, Jr., Atlanta; Frederick T. Zendt, Norcross; Leo J. Thompson, Lilburn, all of Ga.

[73] Assignee: Scientific-Atlanta, Inc., Atlanta, Ga.

[21] Appl. No.: 188,478

[22] Filed: Apr. 29, 1988

[51] Int. Cl.$^4$ ............................................. H04K 1/00
[52] U.S. Cl. ............................................. 375/1; 380/1
[58] Field of Search ................. 375/1; 380/34, 12; 455/5

[56] References Cited

U.S. PATENT DOCUMENTS

| | | | |
|---|---|---|---|
| 3,750,022 | 7/1973 | Curry et al. | 455/5 |
| 3,886,538 | 5/1975 | Takeuchi | 465/3 |
| 3,943,447 | 3/1976 | Shomo, III | 455/ |
| 4,002,843 | 1/1977 | Rackman | 455/5 |
| 4,475,208 | 10/1984 | Ricketts | 375/1 |
| 4,494,138 | 1/1985 | Shimp | 455/5 |
| 4,586,078 | 4/1986 | Citta et al. | 455/5 |
| 4,635,274 | 1/1987 | Kubora et al. | 375/1 |
| 4,706,284 | 11/1987 | Citta et al. | 380/12 |

OTHER PUBLICATIONS

"Performance History in Two-Way Cable Plants Utilizing a PSK Communications System", Pub. Citta et al., 1987; NCTA; pp. 251=260.

"Security Considerations for Impulse Pay-Per-Systems"; Pub. Citta et al., 1987; NCTA; pp. 154-159.

"Two-Way Cable Plant Characteristics", Pub. Citta et al., 1984; NCTA; pp. 270-277.

"Spread Spectrum Used in Distributed Home Bus" by Richard Dohetry News Release of NEC Showing Approximately Jan. 1988.

Primary Examiner—Salvatore Cangialosi
Attorney, Agent, or Firm—Banner, Birch, McKie & Beckett

[57] ABSTRACT

Apparatus for transmitting data spread across at least a portion of the bandwidth of a cable television channel comprises a carrier signal oscillator, a frequency divider, a pseudorandom sequence generator and two exclusive OR gates. A first exclusive OR gate serves to spread a data signal across the pseudorandom noise sequence generator having a much higher chip rate than the bit rate of the data signal. The second exclusive OR gate modulates the spread spectrum data signal to a carrier frequency for transmission over the cable television channel. The apparatus may be applied for return path transmission in the 0-30 megahertz band which is high susceptible to interference noise and provides approximately a 20 dB signal to interference ratio advantage over known data coding and transmission schemes. A microprocessor normally present in a cable television terminal may format data for transmission, control the spread spectrum modulation process and control gain control circuitry for introducing an appropriate power level into the cable plant.

17 Claims, 8 Drawing Sheets

FIG. 3(a). BINARY DATA
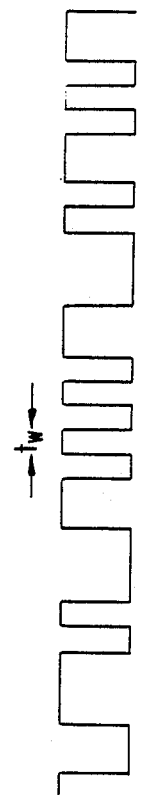
FIG. 3(b). PSEUDO RANDOM NOISE SEQUENCE
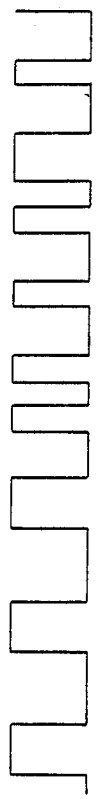
FIG. 3(c). ADDITION OF (a) AND (b) = TRANSMITTED SIGNAL

CABLE TELEVISION SPREAD SPECTRUM DATA TRANSMISSION APPARATUS

BACKGROUND OF THE INVENTION

1. Technical Field

This invention relates to cable television systems and, more particularly, to apparatus for transmitting data over a cable television channel susceptible to interference noise, the transmitted data being spread over at least a portion of the spectrum of the cable television channel.

2. Description of the Prior Art

The development of cable television systems has reached the stage where not only is the provision of two way information flow desirable but is practically required by the implementation of new services. For example, in the implementation of impulse pay-per-view service where the subscriber may impulsively select an event for viewing and assume a charge, at least one data channel is required in a direction from a cable television subscriber to a cable television headend to report service usage data. Other uses for a return path include power meter reading, alarm services, subscriber polling and voting and home shopping. While not every cable television system operator provides for two way transmission, manufacturers of cable television equipment have tended to provide for so-called upstream transmission in a direction from a subscriber toward a headend. Practically all such manufacturers provide so-called split or two way systems having a spectrum of frequencies for upstream transmission which at least includes a band from 0 and 30 megahertz. This band of interest comprises cable television channel T7 (5.75–11.75 megahertz), T8 (11.75–17.75 megahertz), T9 (17.75–23.75 megahertz) and T10 (23.75–29.75 megahertz). Whether a so-called "sub-split", "midsplit" or "high-split" system is applied for two way transmission by a headend operator, all three types of split transmission systems typically involve an upstream transmission in the 0–30 megahertz band of interest.

An article entitled "Two-Way Cable Plant Characteristics" by Richard Citta and Dennis Mutzbaugh published in the 1984 National Cable Television Association conference papers demonstrates the results of an examination of typical cable television (CATV) return plants. Five major characteristics in the 0–30 megahertz upstream band were analyzed. These include white noise and the funneling effect; ingress or unwanted external signals; common mode distortion resulting from defective distribution apparatus; impulse noise from power line interference and other influences; and amplifier non-linearities.

White noise and Gaussian noise are terms often used to describe random noise characteristics. White noise describes a uniform distribution of noise power versus frequency, i.e., a constant power spectral density in the band of interest, here, 0–30 megahertz. Components of random noise include thermal noise related to temperature, shot noise created by active devices, and 1/f or low frequency noise which decreases with increased frequency. The term noise floor is used to describe the constant power level of such white noise across the band of interest.

This noise is carried through each return distribution amplifier which adds its own noise and is bridged to the noise from all branches to a line to the headend. This addition of noise from each branch of a distribution tree in a direction toward a headend is known as noise funnelling or the funnelling effect. The constant noise floor power level defines a noise level which a data carrier power level should exceed.

The present invention is especially concerned with interference noise which causes peaks in the noise spectral density distribution in the band of interest. Interference noise destroys effective data transmission when known data transmission coding techniques such as frequency or phase shift keying are practiced. In particular, interference noise especially relates to four characteristics of return plant introduced above: ingress, common mode distortion, impulse noise and amplifier nonlinearities.

Ingress is unwanted external signals entering the cable plant at weak points in the cable such as shield discontinuities, improper grounding and bonding of cable sheaths, and faulty connectors. At these weak points, radio frequency carriers may enter caused by broadcasts in, for example, the local AM band, citizen's band, ham operator band, or local or international shortwave band. Consequently, interference noise peaks at particular carrier frequencies may be seen in noise spectral density measurements taken on plant susceptible to ingress.

Common mode distortion is the result of nonlinearities in the cable plant caused by connector corrosion creating point contact diodes. The effect of these diodes in the return plant is that difference products of driving signals consistently appear as noise power peaks at multiples of 6 megahertz, i.e. 6, 12, 18, 24 and 30 megahertz in the band of interest.

Impulse noise is defined as noise consisting of impulses of high power level and short duration. Corona and gap impulse noise are created by power line discharge. Temperature and humidity are especially influential in determining the degree of corona noise, while gap noise is a direct result of a power system fault, for example, a bad or cracked insulator. The resultant impulse noise spectrum can extend into the tens of megahertz with a sin x/x distribution.

Amplifier nonlinearities or oscillations relate to pulse regenerative oscillations caused by marginally stable or improperly terminated amplifiers. The result is a comb of frequency peaks within the return plant band whose spacing is related to the distance between the mistermination and the amplifier.

All of these phenomena define interference noise as used in the specification and claims. The present invention provides an approximately 20 dB advantage in interference noise rejection over known modulated frequency or phase shift keying data transmission techniques.

From examining typical cable distribution plants, Citta et al. concluded that "holes" exist in valleys between peaks in the noise spectrum they plotted between 0 and 30 megahertz. They proposed that these valleys may be used to advantage by carefully choosing return carriers "slotted" in these valleys.

In follow-up articles published at the 1987 National Cable Television Conference, Citta et al. conclude that a 45 kilobit data signal may be transmitted by a coherent phase shift keying (CPSK) technique over carriers at 5.5 megahertz and 11.0 megahertz or in the vicinity of the T7 and T8 cable television channels respectively. While the choice of these carrier frequencies is claimed to avoid the noise distribution peaks caused by interference noise, there is considerable concern that such a modulated phase shift keyed data stream will run into noise peaks in a cable television distribution network outside of the investigations of Citta et al.

Other return path or upstream data transmission schemes have been tried. These schemes include, for example, the telephone system, described as "ubiquitous" by Citta et al. In other words, the return data path to a cable television headend is not provided over the cable television distribution plant at all. The serving cable is intentionally avoided either because of the interference noise problem in a split system or because the system is a one way downstream system. Instead, the subscriber's telephone line is used for data transmission. In this distance, however, there is concern that local telephone data tariffs may require the payment of line conditioning surcharges if the telephone line to a subscriber's home is used for data transmission in addition to normal "plain old" telephone service. Furthermore, the telephone line is only available when the subscriber is not using it, requiring an unscheduled or periodic data flow.

Another known return data transmission scheme involves the application of a separate data channel at a carrier frequency that avoids the troublesome 0-30 megahertz band. This scheme, of avoiding the noisy 0-30 megahertz band, is only possible in midsplit and high split systems.

So-called spread spectrum transmission of data is a technology which evolved for military requirements from the need to communicate with underwater submarines in a secure manner. Spread spectrum derives its name from spreading a data signal having a comparatively narrow bandwidth over a much larger spectrum than would be normally required for transmitting the narrow band data signal.

More recently the security advantages provided by spread spectrum transmission have been disregarded in favor of its capability of application in an environment of interference. For example, communications systems operating over a power line where impulse noise levels due to the power line are high have been attempted in the past but found to be only marginally acceptable, for example, power line plug-in intercom systems commercially available from Tandy Radio Shack. The Japanese N.E.C Home Electronics Group, however, has demonstrated a spread spectrum home bus operating at 9600 baud over an AC line in a home that is practical up to distances of 200 meters of power line. The NEC system has been characterized as the missing link between a coaxial cable (for example, a cable television cable) and an AC power line common to the majority of homes.

To understand spread spectrum and how it operates to eliminate the effects of interference, it is first important to define terminology surrounding pseudorandom noise or chip sequence generation. A binary pulse value of one or zero in a pseudorandom sequence is known as a chip. The speed of chip sequence generation is known as a chip rate. Rather than calling a sequence of bits a bit sequence, a pseudorandom sequence generated by a pseudorandom sequence generator is known as a chip sequence.

The process of spread spectrum involves the spreading of a comparatively narrowband binary data signal over a relatively broad frequency spectrum such as by mixing the binary data signal with a pseudorandom chip sequence at a much higher chip rate. The effectiveness of improving signal to interference ratio is related to the ratio of the bandwidth of the spread spectrum to the bandwidth of the data signal. The larger the ratio, the greater the effectiveness. When the pseudorandom chip sequence used to spread the data at the transmitter is correlated with an identical chip sequence generated at a receiver, the original data stream will be recovered. For broader band noise interference, the correlation process picks out the broadband wanted signal while keeping the interference broadband. For narrowband interference, the interfering signal is spread over the spread spectrum bandwidth. In both cases the correlation process provides a narrowband output for the wanted signal. The net effect of the entire process is a much enhanced signal-to-interference ratio.

Despite the development of the spread spectrum arts, the requirement remains in the cable television art for an upstream data transmission from a subscriber premises to a cable television headend that is impervious to interference noise.

SUMMARY OF THE INVENTION

It is therefore an object of the present invention to provide a data channel for upstream data transmission from a cable television subscriber to a cable television headend over a CATV distribution plant which is impervious to interference noise.

It is a further object of the present invention to provide an upstream data channel in the noisy 0-30 megahertz upstream data transmission band of the cable television system spectrum.

It is a still further object of the present invention to reduce the cost of a data transmitter as much as possible.

It is a still further object to provide a data transmission impervious to the effects of interference noise regardless of the choice of data carrier frequency.

These and other objects are achieved by the principles surrounding the development of the present invention, apparatus for spread spectrum data transmission over a cable television channel, in particular, one in a noisy 0-30 megahertz cable television upstream transmission band. In order to conserve costs at a subscriber location associated with providing a data transmitter, the present data transmitter involves a microprocessor normally present in a subscriber cable television terminal for data formatting and transmission control. An oscillator may provide a carrier channel frequency output and sequence the operation of a pseudorandom noise sequence generator. The oscillator may be the same oscillator as is normally applied to clock the operation of the microprocessor. Aside from these components, two Exclusive-OR gates are employed for the respective purposes of providing a spread spectrum data signal and a modulated data carrier signal. A gain control amplifier under the control of the microprocessor may provide a plurality of stepped power level outputs to the serving cable. By means of a diplex filter, a coherent phase shift keyed (CPSK) signal may be alternatively provided to the serving cable and the higher frequency band of downstream television or data channels received simultaneously.

A data receiver provided at the headend receives spread spectrum data transmissions which the headend has addressably ordered a particular subscriber terminal to provide. In the alternative a so-called global command issued by the headend may initiate a data response by a group of subscribers over a corresponding group of code division multiplexed spread spectrum channels in the 0-30 megahertz band.

The data receiver particularly comprises a pseudorandom noise sequence generator having the same predetermined chip sequence as the transmitter. After the spread spectrum signal is demodulated from the carrier frequency, the locally generated pseudorandom chip sequence is subtracted so that only the data remains. To synchronize the carrier oscillators of the transmitter and receiver, a Costas loop is employed at the receiver which derives an error signal for controlling the carrier frequency oscillator by comparing the data outputs provided from an in-phase signal and from a quadrature signal (or 90° out-of-phase signal). The pseudorandom noise sequence generator at the receiver is synchronized and correlated to be in phase with one at the transmitter by means of less expensive but slower early/late gating techniques or by more expensive but faster correlation circuitry. The faster correlation circuitry, although more expensive, provides improved responsiveness and, hence, greater data throughput at the headend when a considerable number of subscribers are involved.

These and other features of the present invention will be readily understood by one skilled in the art from the following detailed description of the drawings.

BRIEF DESCRIPTION OF THE DRAWINGS

FIGS. 3(a), 3(b), and 3(c) are timing diagrams depicting the mixing of a pseudorandom noise signal with binary data;

DETAILED DESCRIPTION OF THE INVENTION

Figure 1:
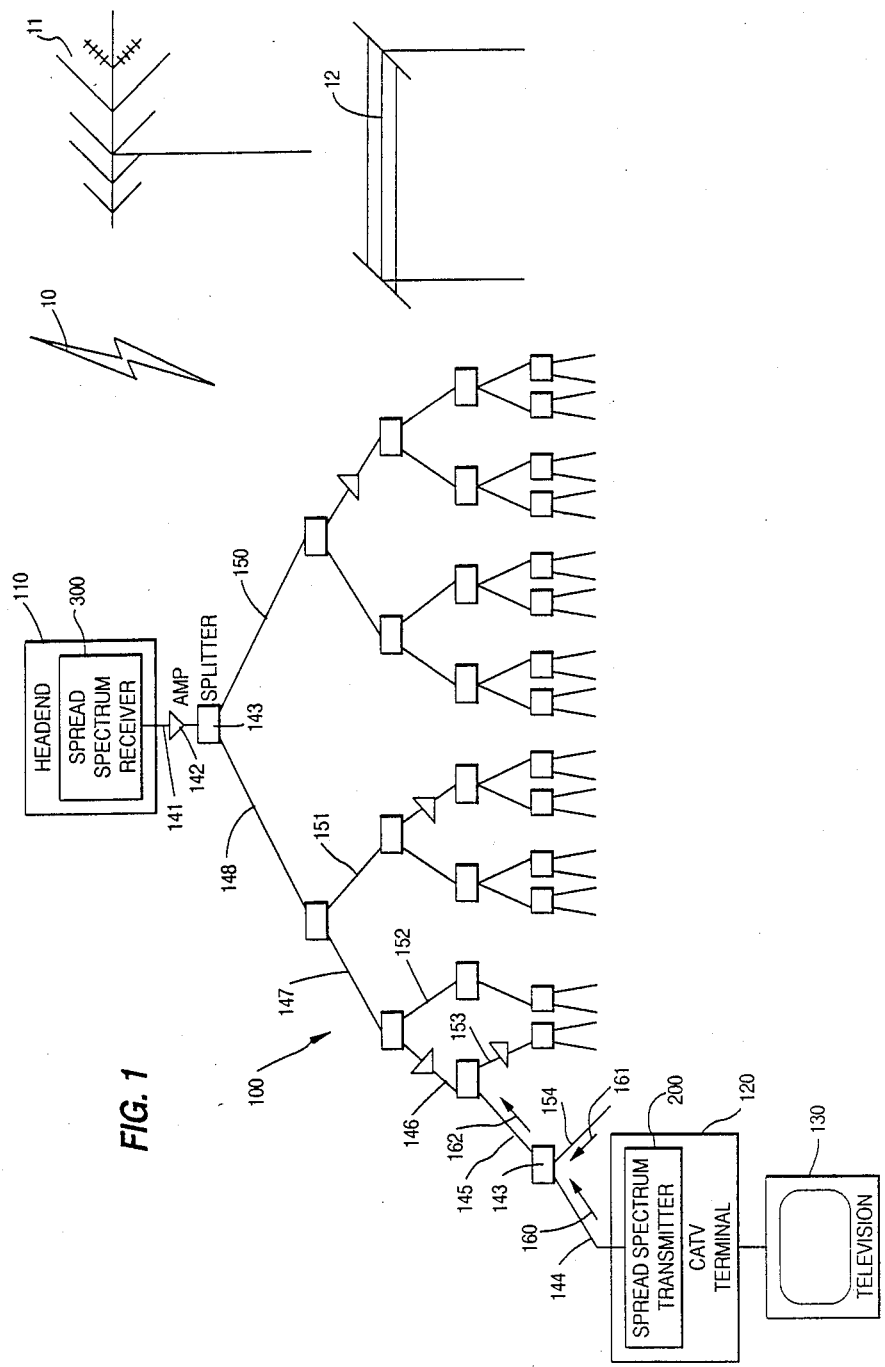
FIG. 1 is an overview block diagram depicting a CATV distribution plant with distribution amplifiers and splitters enabling connection of a CATV subscriber terminal (spread spectrum transmitter) to a headend (spread spectrum receiver)

FIG. 1 shows a typical cable TV distribution plant 100 for distributing cable television signals to a subscriber and for receiving upstream messages from a subscriber terminal 120. The CATV plant 100 connects a headend 110 to a plurality of subscriber's televisions 130 through CATV terminal 120. CATV plant 100 is connected in a "tree" configuration with branches 148 and 150 using splitters 143. In this configuration, a plurality of subscribers receive the same signal sent from the headend 110. Distribution amplifiers 142 are also regularly distributed along cable plant 100 to boost or repeat a transmitted signal. A transmission from headend 110 to the subscriber at CATV terminal 120 is susceptible to noise introduced along the trunk line 141 and branch lines 148, 147, 146, 145 and drop 144.

Spread spectrum transmitter 200 may be included in or associated with CATV terminal 120 and allows a subscriber to communicate with headend 110 by transmitting messages upstream in the CATV plant. Headend 110 includes spread spectrum receiver 300 for receiving messages transmitted by spread spectrum transmitter 200 in CATV terminal 120 located at any or all of the plurality of subscribers. Many CATV plants are so-called split systems equipped for two-way transmission, that is, transmission from headend to subscriber and from subscriber to headend. In these CATV plants, amplifiers 142 are equipped for bidirectional transmission including reverse path amplification.

Two-way transmission in CATV plants heretofore has been avoided by cable television companies in part because upstream transmission from the subscriber to the headend is significantly more susceptible to interference noise. Upstream communication is more susceptible to interference noise because a CATV plant is configured in a "tree" configuration allowing interference noise from every point in the CATV plant to be propagated and amplified in the upstream direction. This may be referred to as the funneling effect. For instance, interference noise 161 and 160 on lines 154 and 144 will combine at splitter 143 connected to drop 144 and branch 154. As the signals travel toward headend 110, the noise will combine with noise on branch lines 153, 152, 151, 150 and every other line in the entire CATV plant. In the upstream direction, it is more difficult to discriminate a transmitted data signal at headend 110 from the noise induced in every branch of the CATV plant.

Interference noise can include impulse noise, common mode distortion, ingress and amplifier nonlinearities. Lighting 10, radio broadcasts 11, and power lines 12 are exemplary sources of interference noise. CATV plants may contain old and faulty connectors, corroded connectors, shield discontinuities, improperly grounded and bonded cable sheaths or the like, which allow noise to enter anywhere in the CATV plant. Aging splitters 143 or old, non-linear amps 142 may also cause interference noise. Because interference noise from all branches of the CATV plant affects upstream transmission while interference noise along only a single downstream line (for example, 141, 148, 147, 146, 145, 144) affects downstream transmission, an upstream CATV plant as it ages will require costly maintenance sooner than a downstream CATV plant. The present invention allows transmission of upstream communication signals on an "imperfect" CATV plant where upstream transmission was heretofore difficult without costly routine maintenance of the CATV plant. The present invention allows bidirectional transmission of messages in a CATV plant much noisier than heretofore possible.

Figure 2:
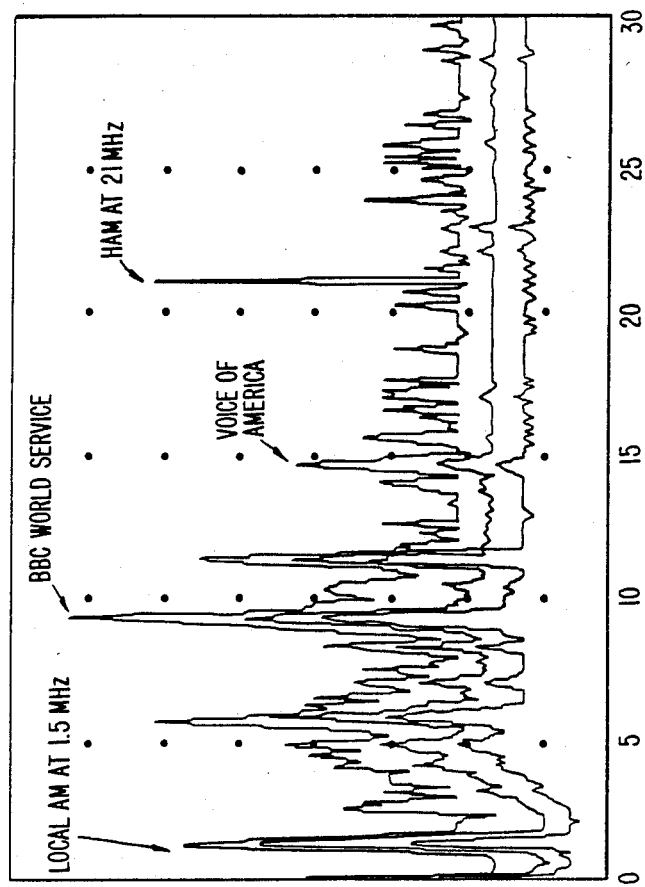
FIG. 2 is a plot of noise level versus frequency over the upstream 0-30 megahertz band of one typical CATV distribution plant.

Referring now to FIG. 2, there is shown a graph of noise power level versus frequency for a typical cable television plant. The measurements were taken at prime time viewing (evening) on a relatively new installation. The effects of ingress are seen to be especially severe in the measured plant from a local AM station at 1500 kilohertz, the British World Service, the Voice of America and a ham operator broadcasting at 21 megahertz. It can be quickly seen that transmission by known techniques on channel T7 (5.75-11.75 megahertz) would be practically impossible. Furthermore, it may be generally seen from the distribution that the higher the frequency, the less troublesome the interference noise.

The effects of common mode distortion were not particularly severe at the time of the measurements. However, the plant was again examined approximately one year later and peaks due to common mode distortion were predictably seen at 6, 12, 18, and 24 megahertz.

FIG. 3(a) shows a binary data signal at, for example, 9600 baud for transmission using spread spectrum techniques over a CATV plant. In the transmitter, the binary data having a pulse width 1/D shown in FIG. 3(a) is mixed with a pseudorandom noise sequence shown in FIG. 3(b). A pseudorandom noise sequence is a repeating predetermined sequence of pulses, for example, at approximately 1.2192 megachips per second, each pulse having a chip width $t_w$. The ratio of pulse width to chip width or alternatively chip rate to bit rate determines the effectiveness of interference noise rejection. Since the chip rate is less than the bandwidth of a television channel, spread spectrum data transmission may comprise at least a portion of the channel spectrum and may comprise multiplexed plural transmissions at different carrier frequencies within the spectrum. Identical pseudorandom noise sequences are contained in both the transmitter and receiver so a transmitted binary data signal can be encoded by spreading using the pseudorandom noise sequence at the transmitter and decoded by de-spreading using the identical pseudorandom noise sequence at the receiver. FIG. 3(c) shows the encoded spread spectrum signal formed by adding the binary data of FIG. 3(a) and the pseudorandom noise sequence of FIG. 3(b). At the receiver, when the transmitted spread spectrum signal is decoded, the pseudorandom noise sequence from the transmitter must be synchronized with the pseudorandom noise sequence in the receiver. This is performed by synchronization and correlation of the sequences in the receiver. Schematic block diagrams of synchronization and correlation circuitry in the transmitter and receiver will later be discussed in reference to FIGS. 5 and 6.

Figure 4A:
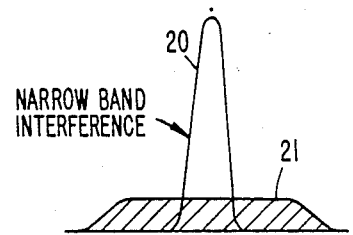
FIGS. 4(a) through 4(d) are frequency plots for narrowband and broadband interference showing the desired signal separated from the interference when the transmitted signal is correlated at the receiver.
Figure 4B:
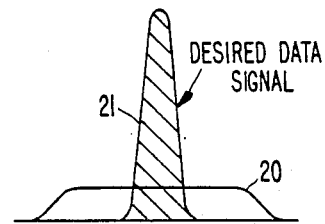
Figure 4C:
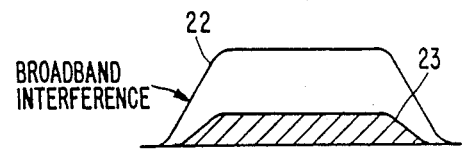
Figure 4D:
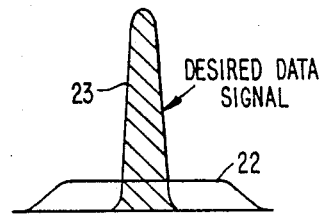

Spread spectrum techniques allow an overall signal power gain of $1/Dt_w$ to be achieved, wherein the data elements are of duration 1/D (FIG. 3(a)) and the chip width of the pseudorandom sequence is $t_w$ (FIG. 3(b)). FIGS. 4(a) through 4(d) illustrate spread spectrum's effective reduction of noise effects for both narrowband and broadband interference. FIG. 4(a) shows a frequency plot of encoded (spread) data signal 21 and narrowband interference 20 as received at the receiver. FIG. 4(b) shows a frequency plot of data signal 21 and narrowband interference 20 after correlation and decoding (despreading). FIG. 4(c) shows a frequency plot of data signal 23 and broadband interference 22 as received at the receiver after correlation and decoding (despreading). FIG. 4(d) shows a frequency plot of correlated and decoded, (de-spread) data signal 23 and broadband interference 22. As can be seen from the frequency plots of FIGS. 4(a)–4(d), the net effect of encoding (spreading) and decoding (de-spreading) the desired data signal for either type of narrowband or broadband interference is therefore a much enhanced signal-to-interference ratio.

A brief overview of spread spectrum and how it relates to other communication systems can be found in *HF Communications: A Systems Approach*, by Nicholas N. Maslin, published in 1987 by Pittman Publishing, London, England, pp. 196, 197, 222 and 223.

Figure 5:
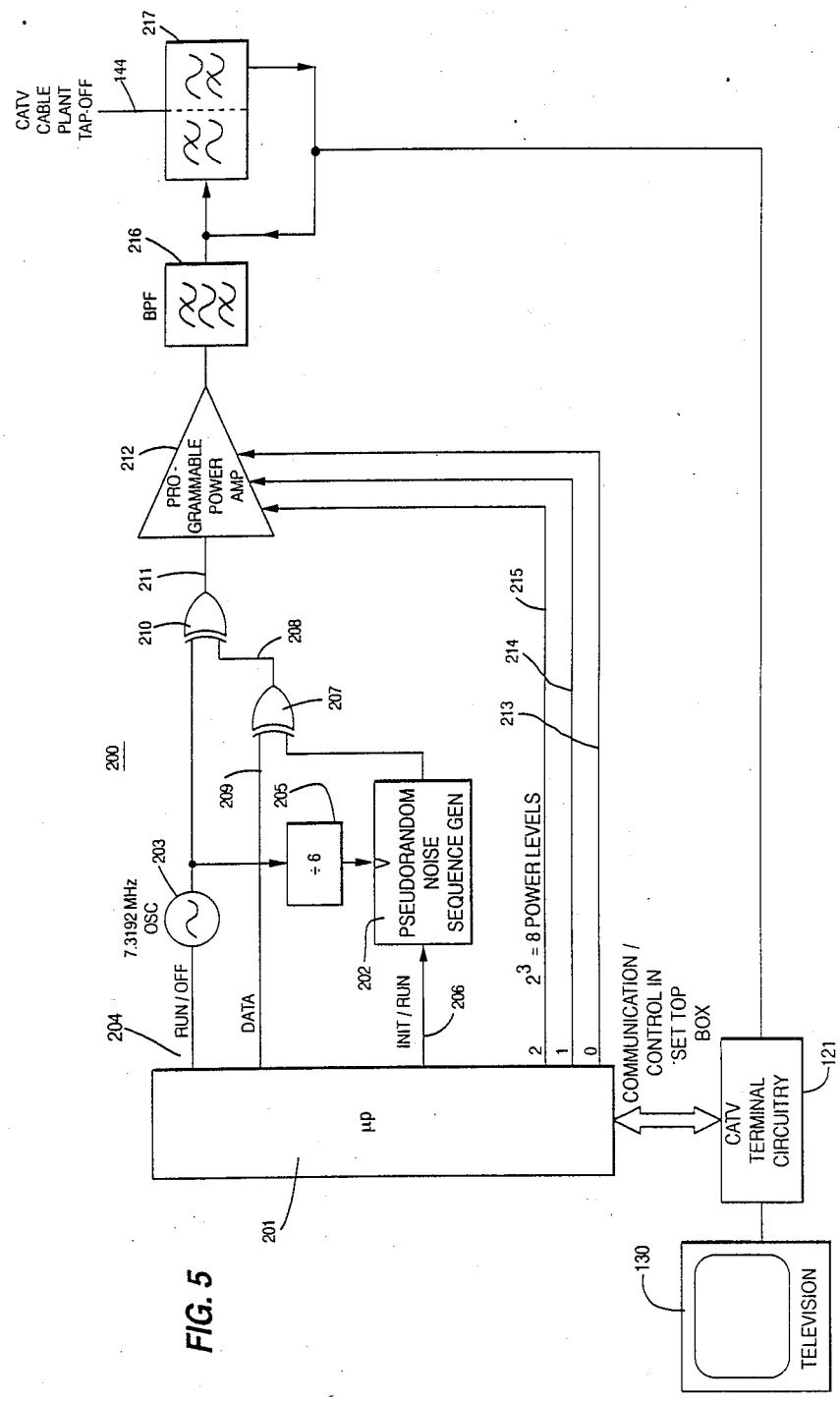
FIG. 5 is a schematic block diagram showing the spread spectrum transmitter for a CATV terminal connected to the CATV distribution plant.

FIG. 5 shows a spread spectrum transmitter 200 of a CATV terminal 120 (FIG. 1) connected to a television 130 and CATV plant 100 via drop 144. CATV terminal 120 comprises transmitter 200 and other circuitry 121. Microprocessor 201 preferably controls all the operations of the CATV terminal 120 responsive to commands received from headend 110 or from a subscriber via, for example, a remote control keyboard (not shown). However, a separate microprocessor can be used to control the CATV terminal circuitry 121 and microprocessor 201 can be used to control the spread spectrum transmitter 200.

Responsive to an addressed or global command, microprocessor 201 retrieves data from memory (for example, impulse pay-per-view service usage data) and formats the data for transmission. A clock signal operating processor 201 is divided down to clock the data stream output DATA at the appropriate rate, for example, 9600 baud and the microprocessor provides the data in a predetermined format and in phase with a pseudo-random sequence generation (FIGS. 3a and 3b).

The pseudorandom noise sequence is generated by pseudorandom noise sequence generator 202. Microprocessor 201 controls a 7.3152 megahertz carrier frequency oscillator 203 over RUN/OFF line 204. Oscillator 203 provides both a carrier frequency output for example, within the T7 band at 7.3152 megahertz and a sequencing clock for the pseudorandom sequence generator. Additionally, oscillator 203 may provide clock signal for clocking the operation of microprocessor 201. Of course, other carrier frequencies may be appropriately selected for application in sub-split, mid-split or high split systems which may, for example, be multiples of 7.3152 megahertz. The output of carrier frequency oscillator 203 is divided down by six in counter 205. Alternatively a separate oscillator may be provided for generating a sequencing signal. The 0.219 megahertz output of counter 205 clocks the sequencing in pseudorandom noise generator 202. Microprocessor 201 controls the operation of pseudorandom noise generator 202 over INIT/RUN line 206. The pseudorandom noise sequence, for example, of a length of 127 chips generated at the output of the pseudorandom noise generator 202 is mixed in mixer 207 with binary data signal 209. Mixer 207 preferably comprises an Exclusive-OR gate. The output 208 of mixer 207 is the encoded spread spectrum data signal shown in FIG. 3(c). Binary data signal 209 is depicted in FIG. 3(a) and the pseudorandom noise sequence is depicted in FIG. 3(b). The encoded spread spectrum data signal output 208 of mixer 207 is mixed with the 7.3152 megahertz carrier frequency output from oscillator 203. Mixer 210 is also preferably an Exclusive-OR gate. The output 211 of mixer 210 is the modulated spread spectrum data signal to be transmitted. The output 211 of mixer 210 is provided to programmable amplifier 212.

Divide by six circuit 205 can be constructed using a four bit counter, for example, Motorola 74HC161. The pseudorandom noise sequence generator can be constructed using a shift register. Outputs selected from the shift register predetermine the desired sequence to be generated. Outputs of the shift register are logically summed together and can be fed back to the input creating a sequence longer than the length of the shift register. The pseudorandom noise generator can be constructed using a Motorola MC 74HC164 and 74HC86. Those of skill may also construct the pseudorandom noise sequence generator using a clocked, sequential address EPROM or other memory device.

Modulated spread spectrum data signal 211 is amplified by programmable power amplifier 212. Programmable power amplifier 212 is illustrated with eight levels of gain. The eight levels of gain are programmable by three binary control lines 213, 214 and 215, connected to microprocessor 201. A desired level may be downloaded to microprocessor 201 by means of an addressed command from headend 110 or preset at installation. The output of programmable power amplifier 212 connects to a bandpass filter 216 having an approximately six megahertz or less passband, the bandwidth of any one of the T7, T8, T9 or T10 channels in the 0–30 megahertz band of interest. The center frequency of bandpass filter 216 is the carrier frequency selected for the transmitter.

Bidirectional coupler 217 allows the spread spectrum signal output from bandpass filter 216 to connect through to the CATV plant at subscriber drop 144. Bidirectional coupler 217 allows bidirectional transmission to television 130 and other CATV terminal circuitry 121. In this arrangement, it is possible for other CATV terminal circuitry 121 and/or televisions 130 to receive and transmit video, audio, data, and other communications from headend 110 via bidirectional coupler 217 independently of the spread spectrum transmitter 208 possibly using other data encoding and modulation techniques known in the art such as coherent phase shift keying (CPSK).

To reduce costs, transmitter 200 is designed to use a minimum number of components since there are typically hundreds or thousands of transmitters 200 in a CATV system. For example, the microprocessor is used to every extent possible for data formatting and transmission control limiting the hardware requirements to an oscillator, two Exclusive OR gates, a counter, a sequence generator, and an amplifier. Because there is only one headend 110 in a CATV system, the cost of additional components at the location of the spread spectrum receiver 300 can be tolerated.

Figure 6:
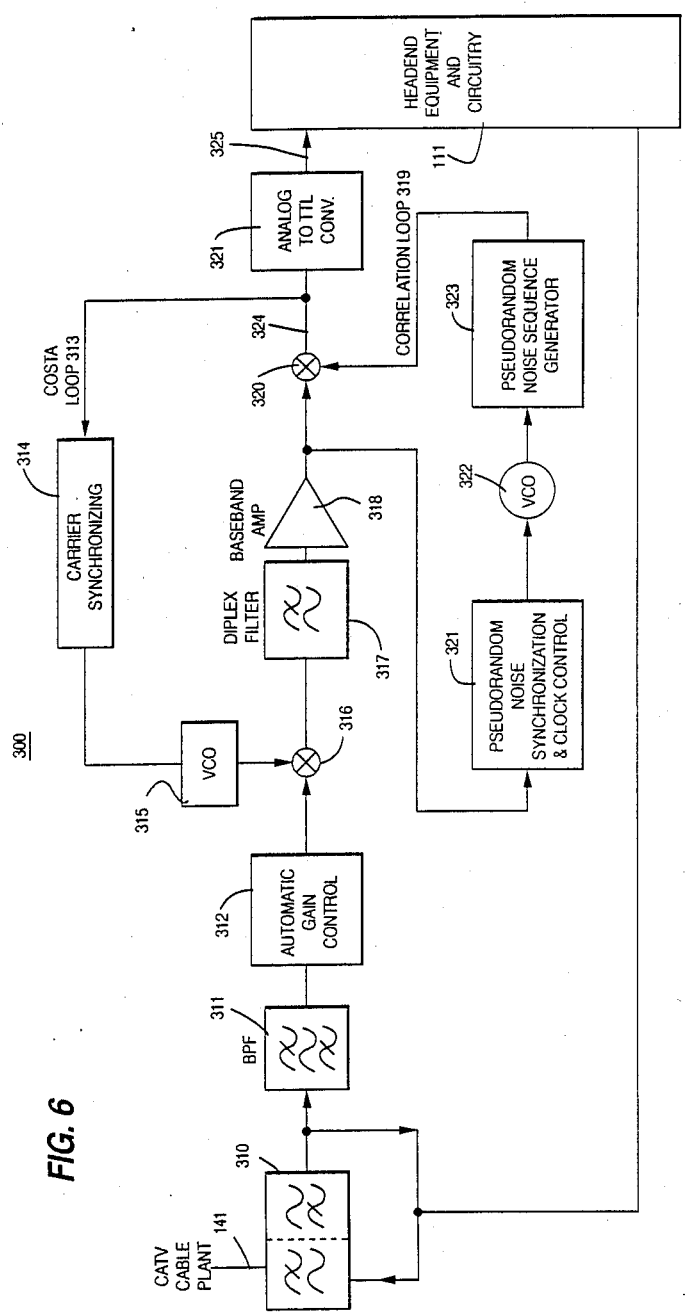
FIG. 6 is a schematic block diagram showing the spread spectrum receiver at the headend of a CATV plant.

FIG. 6 shows spread spectrum receiver 300 connected at trunk 141 to the CATV distribution plant 100 and connected at terminal 325 to other headend equipment and circuitry 111. The received spread spectrum signal at trunk 141 is input through bidirectional coupler 310. Bidirectional coupler 310, like bidirectional coupler 217, allows bidirectional communication of video, audio, data, and other communications to and from other headend equipment and circuitry 111. Bandpass filter 311, like bandpass filter 216, is connected to the output of bidirectional coupler 310 and has a bandwidth less than or equal to six megahertz (or a portion of the channel spectrum) and a center frequency at the modulated spread spectrum data channel frequency to be received. Automatic gain control 312 adjusts the output of bandpass filter 311 to a predetermined level.

Costas loop 313 synchronizes the carrier frequencies of the transmitter and receiver using carrier synchronizing circuitry 314 and voltage controlled oscillator 315. An error signal is derived from received data output 324 in the Costas loop through carrier synchronizing circuitry 314 for adjusting voltage controlled oscillator 315. At mixer 316 the carrier frequency output of VCO 315 is mixed with the output of automatic gain control 312. The Costas loop preferably uses a quadrature and an in-phase dual line circuit arrangement which will later be described in conjunction with FIG. 7. At the output of mixer 316 is the baseband spread spectrum data signal.

The spread spectrum data signal output of mixer 316 is passed through diplex filter 317 and baseband amplifier 318. The spread spectrum data signal output of baseband amplifier 318 is fed through correlation loop 319. Correlation loop 319 synchronizes and correlates the pseudorandom noise sequence generated in the receiver identically with the pseudorandom noise sequence in the signal received from the transmitter. The output of baseband amplifier 318 is mixed with the pseudorandom sequence output of correlation loop 319 in mixer 320. Correlation loop 319 comprises pseudorandom noise synchronization and clock control circuitry 321 for controlling voltage controlled oscillator 322. Voltage controlled oscillator 322, in turn, provides a sequencing signal to pseudorandom noise sequence generator 323. The recovered data output 324 at mixer 320 is converted to transistor transistor logic (TTL) voltage levels in analog-to-TTL converter 321. The decoded received digital data is interpreted by other headend equipment and circuitry 111 connected to receive the output of analog-to-TTL converter 321.

Figure 7:
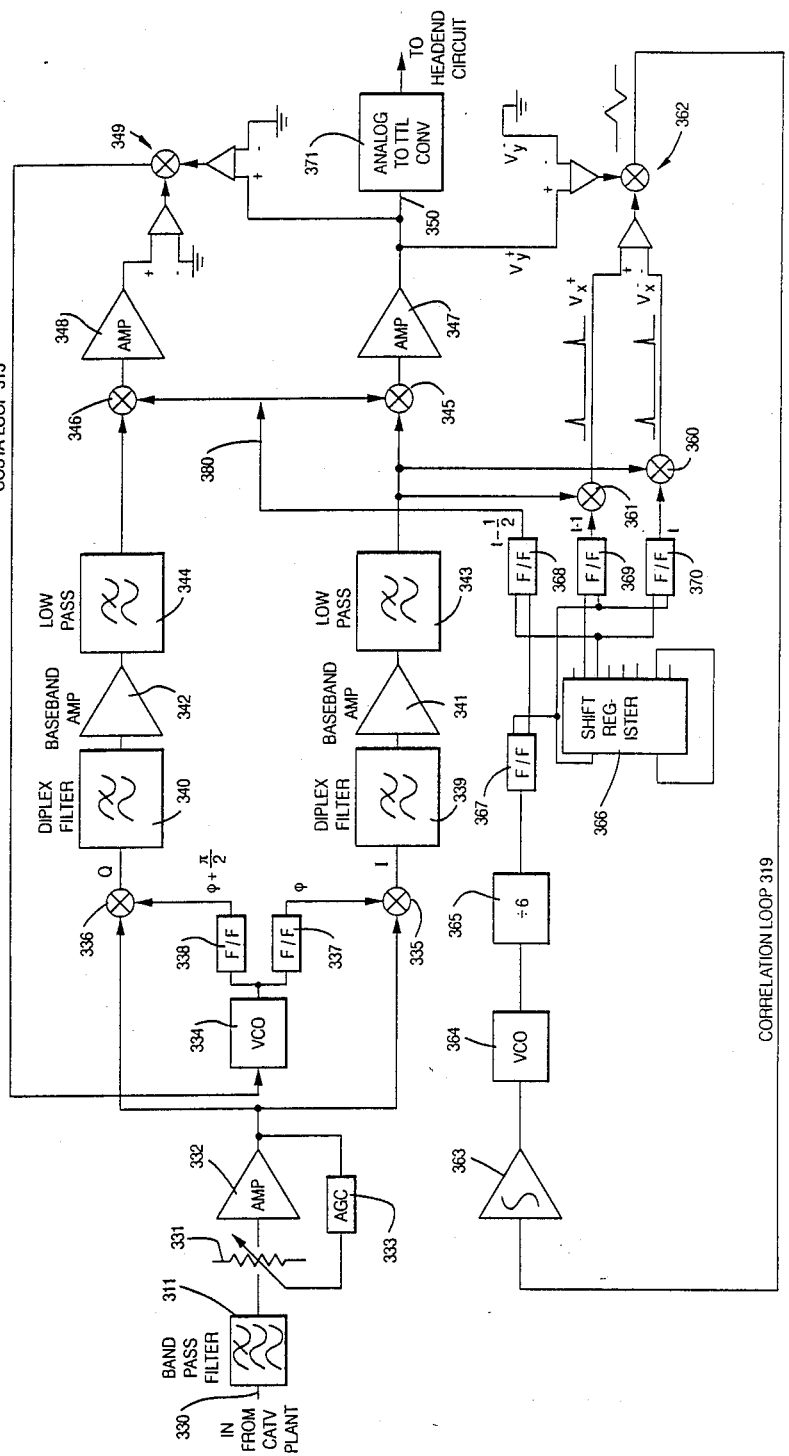
FIG. 7 is a detailed schematic block diagram of the spread spectrum receiver of FIG. 6 using early/late gating.

FIG. 7 shows a detailed schematic block diagram of the spread spectrum receiver of FIG. 6 wherein less expensive but slower early late gating techniques are applied to correlate pseudorandom sequence generation at the receiver with generation at the transmitter. Also Costas loop carrier synchronization is shown in greater detail. Details of the spread spectrum receiver will now be described in conjunction with FIG. 7. Input 330 from CATV plant 100 is connected through bandpass filter 311 whose pass band is centered at the frequency of the transmitted signal. The output of bandpass filter 311 connects to automatic gain control circuitry 331, 332 and 333. Costas loop 313 connects to carrier frequency oscillator 334 to control the frequency mixed with the output of the automatic gain control circuitry 333 at mixers 335 and 336. Voltage controlled oscillator 334 is a crystal oscillator implemented using an ECL line receiver, for example, a Motorola MC10116. The output of voltage controlled oscillator 334 is divided into an in-phase (I) signal by flip-flop 337 and a quadrature (Q), 90° out-of-phase signal, by flip-flop 338. This creates an in-phase (I) path at the output of mixer 335 and a 90° out-of-phase quadrature path Q at the output of mixer 336. Mixers 335 and 336 are preferably double balanced mixers, for example, a Mini-Circuits mixer SBL1. The in-phase (I) path and quadrature (Q) path are respectively connected through diplex filters 339 and 340, baseband amplifiers 341 and 342 and low pass filters 343 and 344. Diplex filters 339 and 340 have a response curve which terminates high frequencies and passes only a band including the pseudorandom chip rate. Low pass filters 343 and 344 are similarly tuned to the pseudorandom chip rate, for example, approximately 1.2 megahertz.

The in-phase (I) spread spectrum data path output at low pass filter 343 is tapped-off and provided to early/late gating correlation loop 319. The tap-off is fed into mixers 360 and 361. A signal 380 which is a properly correlated pseudorandom sequence generator output from correlation loop 319 is returned to Costas loop 313. The pseudorandom sequence is mixed with both the in-phase (I) and quadrature (Q) spread spectrum data paths at mixers 345 and 346. The output of mixer 345 is the desired data recovered from the incoming modulated spread spectrum signal. Mixers 360, 361, 345 and 346 are preferably balanced modulator/demodulator circuits, for example, Motorola MC1496. In Costas loop 313, the in-phase (I) and quadrature (Q) data path outputs from mixers 345 and 346 are respectively fed through amplifiers 347 and 348 and mixed in mixer 349 to provide an error signal. The error signal is fed back to adjust the carrier frequency output of voltage controlled oscillator 334. Mixer 349 is a linear four-quadrant multiplier with differential inputs as illustrated, for example, a Motorola MC1494.

Referring again to correlation loop 319, the in-phase (I) data path output of amplifier 347 is tapped-off and fed into the Vy+ differential input of mixer 362. Differential input $V_y^-$ is connected to ground for a differential input reference of zero. The in-phase (I) spread spectrum data path output from low pass filter 343 is fed through mixers 360 and 361 and respectively mixed with current chip (t) and previous chip (t−1) outputs of the generated pseudorandom noise sequence. The output of mixers 361 and 360 are connected to the plus and minus differential inputs $V_x^+$ and $V_x^-$, respectively, of mixer 362. At mixer 362, the $V_x^+$ and $V_x^-$ inputs are subtracted and multiplied with the in phase data signal $V_y^+$ to preserve the polarity of the output waveform which is an error signal for adjusting oscillator 364. Mixer 362 is a linear four-quadrant multiplier like mixer 349. The resultant from mixer 362 is integrated by integrator 363 to provide the error signal for adjusting the sequencing signal provided by control voltage controlled oscillator 364. Voltage controlled oscillator 364 may be constructed as a crystal oscillator to provide a nominal 14.6304 megahertz output. This output is divided by six at circuit 365. Divide by six circuit 365 is preferably a four bit counter, for example, a Motorola 74HC161. The output of divide by six circuit 365 clocks flip flop 367. Flip flop 367 performs a divide by two function and provides an inverting and a non-inverting output. The non-inverting output of flip flop 367 then clocks shift register 366 and flip flops 369 and 370. Shift register 366 generates the pseudorandom noise sequence. The wiring of output terminals selected from shift register 366 predetermine the desired sequence to be generated. Outputs are logically summed and fed back to an input of shift register 366 to create a sequence longer than the length of shift register 366. Alternatively, a non-volatile memory may be employed to store a temporary sequence which is periodically changed by an addressed or global command from headend 110.

Flip-flop 370 outputs the current chip (t) while flip-flop 369 is tapped-off at an adjacent output terminal and outputs previous chip (t−1). The present chip (t) output of flip-flop 370 is fed to mixer 360, and the output of flip-flop 369, previous chip (t−1), is fed to mixer 361. Flip flop 367 provides an inverted output to flip flop 368. Flip-flop 368 provides chip delayed by one half chip (t−½) output 380.

The present chip delayed by one half chip (t−½) output 380 of flip-flop 368 is fed to mixers 345 and 346 to mix with the in-phase (I) path and the 90° out-of-phase quadrature (Q) path of the Costas loop. Recovered data output 350, the output of spread spectrum receiver 300, is the in-phase (I) data path output at the output of amplifier 347. Data output 350 is converted to transistor-transistor logic (TTL) levels by analog-to-TTL converter 371. Analog-to-TTL converter 371 provides received and decoded binary data to the headend circuits 111 (FIG. 6).

Figure 8:
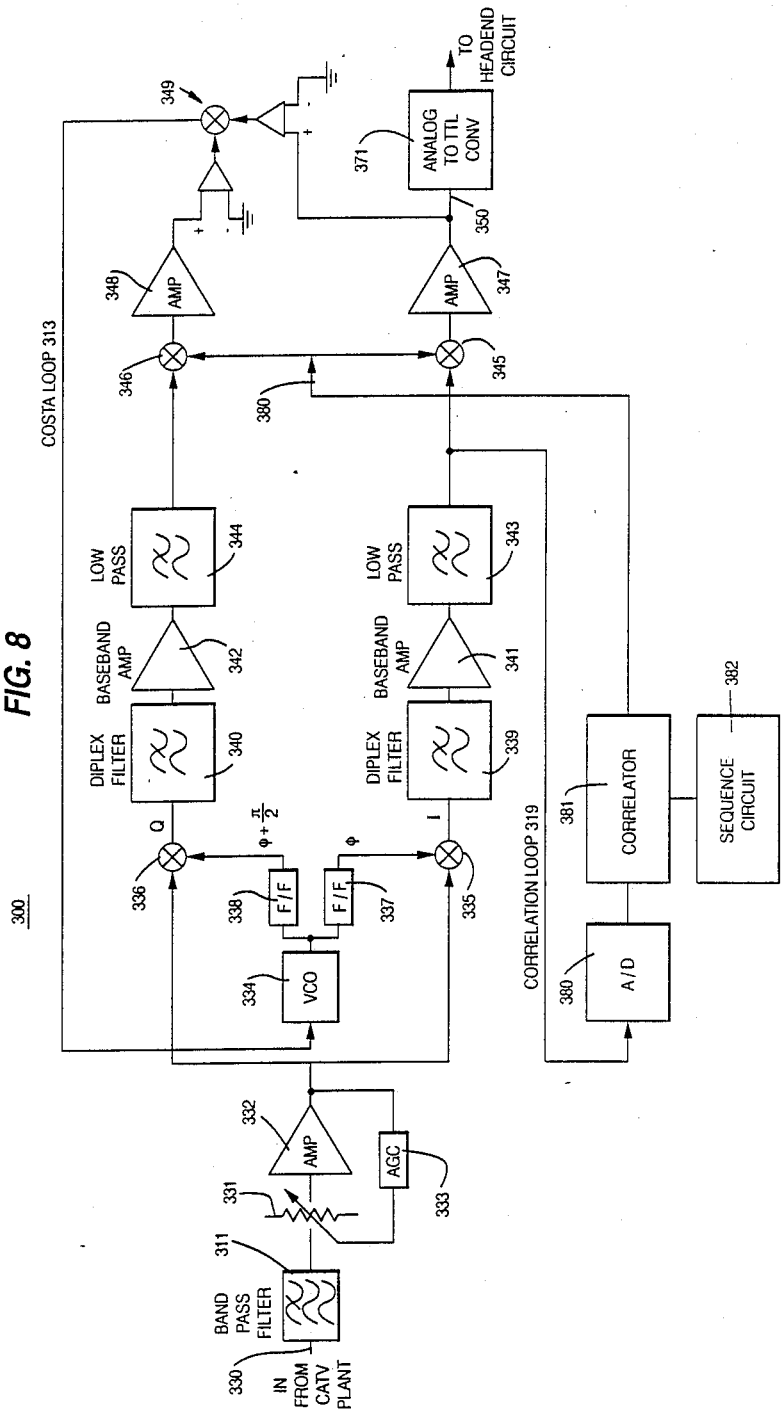
FIG. 8 is a detailed schematic block diagram of the spread spectrum receiver of FIG. 6 using a custom correlator circuit.

FIG. 8 shows an alternative embodiment of correlation loop 319 employing more expensive but faster correlation circuits. Instead of using early/late gating, this correlation loop embodiment taps-off the in-phase (I) path signal and sends it to analog to digital converter 380 for providing a control input to correlator 381. Correlator 381 correlates the received pseudorandom noise sequence with the predetermined pseudorandom noise sequence of sequence generation circuit 382. Sequence circuit 382 can be constructed using a shift register (as in the previous correlation loop embodiment), as a sequentially addressable EPROM, and addressable ROM, or other memory device. Correlator 381 is preferably a correlator circuit, for example, a TRW correlator integrated circuit TMC 220 or a Marconi correlator integrated circuit MA717. Correlator integrated circuits are more expensive than the early/late gating correlation circuit of the embodiment of FIG. 7, yet may be viable since correlator circuits are faster and hence improve data throughput to a headend.

The embodiments of either FIG. 7 or FIG. 8 may be supplemented by the application of frequency division of time division demultiplexing circuitry (not shown) for demultiplexing plural data channels multiplexed in the T7 or another channel band. A group of transmitters may be controlled by headend 110 to provide a time division multiplexed output comprising plural frequency division multiplexed data channels, each data channel being associated with one transmitter. Furthermore, spread spectrum transmission permits the additional opportunity to apply code division multiple access by plural transmitters to a single channel. By this technique, plural transmitters operating with different pseudorandom sequences are able to simultaneously transmit to plural receivers located at headend 110.

Regardless of whether T7 or another noisy channel is selected, the present invention thrives in an environment where interference noise is great. Using the present spread spectrum transmission invention, a headend operator need not be concerned with the quality of maintenance of the return path in a cable television distribution plant. Furthermore, the operator need not be concerned about a choice of a carrier frequency which avoids noise peaks in a noise spectral density distribution.

A cable headend operator concerned about the security of the return data path furthermore need not be concerned with pirating or intentionally fraudulent data transmission as the spread spectrum signal is inherently encrypted by the pseudorandom chip sequence, the degree of encryption being directly related to the degree of noise rejection. In an alternative embodiment, the pseudorandom chip sequence generator may be arranged to permit a periodic change in the pseudorandom chip sequence. The change can be transmitted as a global command to all CATV terminals or as a group command to an addressed group of terminals.

While a return data path has been discussed thus far, of course, the path may be alternatively used for voice transmission via, for example, digitally coded voice transmission. However, voice transmission would require additional analog to digital conversion or a digital telephone interface.

Only upstream applications have been suggested thus far. Applications in a downstream direction of spread spectrum data transmission over a cable television channel are possible and may include captioning for the hearing impaired, status monitoring, high definition television and high resolution graphics or teletext frame transmission. In such applications, the low speed data is likewise spread across at least a portion of the spectrum of the downstream television channel but at a power level sufficiently below the television signal so as to not interfere with television reception. The power level of the modulated spread spectrum data signal may even be dropped to the level of white noise. In this manner, the television signal will not be impaired by the transmission of data under video.

What is claimed is:

1. A data transmission apparatus for use in transmitting data spread across at least a portion of a spectrum provided for a cable television channel of a cable television system comprising a cable television signal distribution plant susceptible to interference noise from proximate power lines, telephone lines, defective cable television signal distribution apparatus of the distribution plant, ineffective grounding of cable sheaths, radio frequency interferences and other sources of interference noise, the data transmission apparatus comprising:

a controller, responsive to an incoming data signal, for providing a stepwise digital control signal for controlling the power level of a signal input to the cable television signal distribution plant, for providing the incoming data signal at a data bit rate to a spread spectrum data signal generator and for controlling the operation of a carrier signal oscillator;

the carrier signal oscillator, responsive to the controller, for providing a carrier signal at a frequency consistent with the frequency of the cable television channel;

a frequency divider, responsive to the carrier signal oscillator, for providing a sequencing signal;

a pseudorandom sequence generator, responsive to the sequencing signal, for generating a predetermined pseudorandom chip sequence at a chip rate an order of magnitude greater than the data bit rate for transmission on the cable television channel within at least a portion of the spectrum corresponding to the cable television channel;

the spread spectrum data signal generator, responsive to the pseudorandom sequence generator and the data signal output of the controller, for generating a spread spectrum data signal;

a carrier signal modulator, responsive to the carrier signal oscillator and the spread spectrum data signal generator, for modulating the spread spectrum data signal for transmission over the cable television channel; and a programmable power amplifier for amplifying the modulated spread spectrum data signal output of the carrier signal modulator in accordance with said stepwise digital control signal from the controller.

2. The data transmission apparatus of claim 1, the cable television channel being a channel selected within a reverse path frequency band.

3. The data transmission apparatus of claim 1, the spread spectrum data signal generator comprising an Exclusive-OR gate.

4. The data transmission apparatus of claim 1, the carrier signal modulator comprising an Exclusive-OR gate coupled to the programmable power amplifier.

5. The data transmission apparatus of claim 2, the cable television channel being channel T7.

6. The data transmission apparatus of claim 1 comprising means for simultaneously transmitting a video signal and the modulated spread spectrum data signal, the power level of the video signal being substantially above the power level of the modulated spread spectrum data signal so as to not interfere with television reception.

7. A data reception apparatus for use in receiving data spread across at least a portion of a spectrum provided by a cable television channel of a cable television system comprising a cable distribution plant susceptible to interference noise, the data reception apparatus comprising:

a quadrature demodulation circuit for removing a spread spectrum data signal from a carrier of the cable television channel;

a Costa loop, responsive to the quadrature demodulation circuit, for synchronization of the quadrature demodulation circuit with a carrier signal modulator of a cable television transmitter;

a pseudorandom sequence generator for generating a pseudorandom chip sequence identical to a pseudorandom sequence generated at said cable television transmitter, the chip rate of said chip sequence being much greater than the data bit rate;

a digital correlation loop, responsive to the quadrature demodulation circuit, for correlating and synchronizing the pseudorandom chip sequence generated at the cable television receiver with the sequence generated at the cable television transmitter; and a quadrature mixer, responsive to the pseudorandom sequence generator and the quadrature demodulation circuit, for recovering the data signal from the spread spectrum data signal.

8. The data reception apparatus of claim 7, wherein the Costa loop synchronizes the quadrature demodulator by mixing with the spread spectrum data signal a generated frequency and by mixing with the spread spectrum data signal a frequency 90° out of phase with said generated frequency.

9. The data reception apparatus of claim 8, wherein the Costa loop further comprises a voltage controlled oscillator for generating said generated frequency.

10. A cable television data transmission system for transmitting data spread across at least a portion of a spectrum provided by a cable television channel of a cable television system, comprising a cable television signal distribution plant susceptible to interference noise from proximate power lines, telephone lines, defective cable television signal distribution apparatus of the distribution plant, ineffective grounding of cable sheaths, radio frequency interferences and other sources of interference noise, the data transmission system comprising:

a controller, responsive to an incoming data signal, for providing a stepwise digital control signal for controlling the power level of a signal input to the cable television signal distribution plant, for providing the incoming data signal at a data bit rate to a spread spectrum data signal generator and for controlling the operation of a carrier signal oscillator;

the carrier signal oscillator, responsive to the controller, for providing a carrier signal at a frequency consistent with the frequency of the cable television channel;

a frequency divider, responsive to the carrier signal oscillator, for providing a sequencing signal;

a first pseudorandom sequence generator, responsive to the sequencing signal, for generating a predetermined pseudorandom chip sequence at a chip rate for transmission on the cable television channel within at least a portion of the spectrum corresponding to the cable television channel;

the spread spectrum data signal generator, responsive to the first pseudorandom sequence generator and the data signal output of the controller, for generating a spread spectrum data signal;

a carrier signal modulator, responsive to the carrier signal oscillator and the spread spectrum data signal generator, for modulating the spread spectrum data signal for transmission over the cable television channel;

a programmable power amplifier for amplifying the modulated spread spectrum data signal output of the carrier signal modulator in accordance with said stepwise digital control signal from the controller;

a quadrature demodulation circuit for removing said spread spectrum data signal from a carrier of the cable television channel;

a Costa loop, responsive to the quadrature demodulation circuit, for synchronization of the quadrature demodulation circuit with the carrier signal modulator;

a second pseudorandom sequence generator for generating a pseudorandom sequence identical to the predetermined pseudorandom chip sequence generated by the first pseudorandom sequence generator;

a digital correlation loop, responsive to the quadrature demodulation circuit, for correlating and synchronizing the pseudorandom chip sequence generated by the second pseudorandom sequence generator with the sequence generated by the first pseudorandom sequence generator; and a quadrature mixer, responsive to the second pseudorandom sequence generator and the quadrature demodulation circuit, for recovering the data signal from the spread spectrum data signal.

11. The cable television data transmission system of claim 10, the cable television channel being a channel selected within a reverse path frequency band.

12. The cable television data transmission system of claim 10, the spread spectrum data signal generator comprising an Exclusive-OR gate.

13. The cable television data transmission system of claim 10, the carrier signal modulator comprising an Exclusive-OR gate coupled to the programmable power amplifier.

14. The cable television data transmission system of claim 10, the chip rate being at least an order of magnitude greater than the data rate.

15. The cable television data transmission system of claim 11, the cable television channel being channel T7.

16. The cable television claim transmission system of claim 10, wherein the Costa loop synchronizes the quadrature demodulator by mixing with the spread spectrum data signal a generated frequency and by mixing with the spread spectrum data signal a frequency 90° out of phase with said generated frequency.

17. The cable television data transmission system of claim 16, wherein the Costa loop further comprises a voltage controlled oscillator for generating said generated frequency.

* * * * *